（12）United States Patent
Dauner et al.

(10) Patent No.: US 12,447,653 B2
(45) Date of Patent: Oct. 21, 2025

(54) METHOD AND MOLD FOR PRODUCING A SANDWICH COMPONENT

(71) Applicant: Bayerische Motoren Werke Aktiengesellschaft, Munich (DE)

(72) Inventors: Willy Dauner, Gersthofen (DE); Martin Schindlbeck, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 282 days.

(21) Appl. No.: 17/912,936

(22) PCT Filed: Mar. 1, 2021

(86) PCT No.: PCT/EP2021/055006
§ 371 (c)(1),
(2) Date: Sep. 20, 2022

(87) PCT Pub. No.: WO2021/213712
PCT Pub. Date: Oct. 28, 2021

(65) Prior Publication Data
US 2023/0158719 A1    May 25, 2023

(30) Foreign Application Priority Data
Apr. 20, 2020 (DE) ............... 10 2020 110 665.3

(51) Int. Cl.
*B29C 44/04* (2006.01)
*B29C 35/04* (2006.01)
(Continued)

(52) U.S. Cl.
CPC ........ *B29C 44/0407* (2013.01); *B29C 35/041* (2013.01); *B29C 44/06* (2013.01);
(Continued)

(58) Field of Classification Search
CPC ............... B29C 44/0407; B29C 44/06; B29C 44/12–188; B29C 44/3415; B29C 44/352
See application file for complete search history.

(56) References Cited

U.S. PATENT DOCUMENTS 3,763,293 A    10/1973   Nussbaum
5,108,691 A *   4/1992   Elliott .................. B29C 43/203
                                                          264/296
(Continued)

FOREIGN PATENT DOCUMENTS

AT       519 381 A2    6/2018
CN       101432117 A   5/2009
(Continued)

OTHER PUBLICATIONS

Translation of EP-1318009-A1 (Year: 2003).*
(Continued)

*Primary Examiner* — John J DeRusso
(74) *Attorney, Agent, or Firm* — Crowell & Moring LLP

(57) ABSTRACT

A method and compression mold are provided for producing a sandwich component, in which an outer shell and an inner shell are compressed, together with foam particles in a cavity between the shells, which cavity is formed by two mold halves of a mold, under pressure and at an increased temperature to form the sandwich component. At least one mold half is heated in a first temperature-control zone to a higher maximum temperature than in a second temperature-control zone.

9 Claims, 3 Drawing Sheets

(51) Int. Cl.
    *B29C 44/06*     (2006.01)
    *B29C 44/12*     (2006.01)
    *B29C 44/34*     (2006.01)
    *B29C 44/44*     (2006.01)
    *B29C 44/58*     (2006.01)
    *B29C 44/60*     (2006.01)
    *B29K 105/04*     (2006.01)
    *B29K 23/00*     (2006.01)
    *B29K 67/00*     (2006.01)

(52) U.S. Cl.
    CPC ...... *B29C 44/1223* (2013.01); *B29C 44/1233* (2013.01); *B29C 44/3415* (2013.01); *B29C 44/352* (2013.01); *B29C 44/445* (2013.01); *B29C 44/58* (2013.01); *B29C 44/60* (2013.01); *B29K 2023/12* (2013.01); *B29K 2067/003* (2013.01); *B29K 2105/04* (2013.01)

(56) References Cited

U.S. PATENT DOCUMENTS

| | | |
|---|---|---|
| 2010/0096780 A1 | 4/2010 | Marc |
| 2012/0080262 A1 | 4/2012 | Soltau et al. |
| 2013/0127092 A1 | 5/2013 | Dauner et al. |
| 2014/0160587 A1 | 6/2014 | Ainz Ibarrondo |
| 2018/0147752 A1 | 5/2018 | Nuernberg et al. |
| 2018/0194044 A1 | 7/2018 | de Groot |
| 2020/0023565 A1 | 1/2020 | Atzinger et al. |

FOREIGN PATENT DOCUMENTS

| | | | |
|---|---|---|---|
| CN | 103068545 A | 4/2013 | |
| CN | 103518103 A | 1/2014 | |
| CN | 107848166 A | 3/2018 | |
| CN | 110739360 A | 1/2020 | |
| DE | 1 778 614 A | 8/1971 | |
| DE | 2 150 047 A | 4/1973 | |
| DE | 20 2006 009 569 U1 | 8/2006 | |
| DE | 10 2006 009 134 A1 | 8/2007 | |
| DE | 10 2011 105 070 A1 | 12/2012 | |
| DE | 10 2016 223 567 A1 | 5/2018 | |
| EP | 0 538 475 A1 | 4/1993 | |
| EP | 1 155 799 A1 | 11/2001 | |
| EP | 1318009 A1 * | 6/2003 | ......... B29C 44/0407 |

OTHER PUBLICATIONS

Chinese-language Office Action issued in Chinese Application No. 202180017956.0 dated Jul. 5, 2023 with English translation (17 pages).

International Search Report (PCT/ISA/210) issued in PCT Application No. PCT/EP2021/055006 dated May 28, 2021 with English translation (six (6) pages).

German-language Written Opinion (PCT/ISA/237) issued in PCT Application No. PCT/EP2021/055006 dated May 28, 2021 (seven (7) pages).

German-language Search Report issued in German Application No. 10 2020 110 665.3 dated Sep. 29, 2020 with partial English translation (10 pages).

* cited by examiner

METHOD AND MOLD FOR PRODUCING A SANDWICH COMPONENT

BACKGROUND AND SUMMARY

The invention relates to a method and a compression mold for producing a sandwich component.

Sandwich components are widespread in aircraft construction, vehicle construction, and in the building industry too. Their high flexural strength and also the combination of good acoustic and thermal insulation with low specific weight give them a large deployment territory. Sandwich components typically have two outer plies and also an interlayer disposed between the outer plies and connected to them.

In aircraft, ship and vehicle construction, the outer layer usually used comprises glass fiber sheets, and the core usually used comprises paper or plastic honeycombs. Sandwich systems with a relatively high strength requirement or additionally, moreover, with sight requirement are produced as follows: the outer laminates are produced first in an RTM, wet compression or prepreg process and then glued to a prefabricated core. The cores may consist, for example, of beaded foam, such as expanded polypropylene (EPP), for example. Cores of these kinds may be produced—as known from publication EP 1155799 A1, for example—by filling the cavity of a mold with a bed of prefoamed particles and then fusing these particles to one another with hot steam to form a beaded foam.

Also known, under the Atecarma designation, is a process in which a beaded foam component can be produced without hot steam. The selected beaded foam is first wetted with an activator and dried. During component production, the pretreated beads are introduced into a shaping mold. The activator is activated thermally and the surfaces of the foam beads develop adhesion properties. The foam bead particles are joined to one another in this process, as are, optionally, at the same time, composite materials and inserts to the foam, and the planned shaped part is formed.

With this process, the opportunity exists, now that there is no longer any need for steam treatment, to insert shells that are impervious to steam in the mold, examples being carbon-reinforced plastics (CRP), decorative laminates, aluminum, etc., which are then compressed with the beads to give a sandwich component.

This process, however, can only be used to produce sandwich laminates having an unchanging component thickness or small fluctuations in thickness. If sandwich components having greatly differing component thicknesses are produced in the operations, unwanted impressions occur on the surface of the components. These impressions appear in particular in regions in which the thickness of the components is comparatively low. Nor is it possible with this process to produce components having an all-round flange, where the outer shell and the inner shell lie one on the other in the flange region without a foam core in between them.

Against this background, it is the object of the invention to provide an improved facility enabling the production of sandwich components having a foam core. The solution is intended in particular to permit simple and cost-effective production of sandwich components with high surface quality and at the same time relatively high degrees of freedom in terms of the component shape.

The object is achieved by a method and by a compression mold according to the independent claims. Further advantageous embodiments are evident from the dependent claims and from the description hereinafter.

A method is specified for producing a sandwich component, wherein an outer shell and an inner shell together with foam particles lying between them are compressed in a cavity, which is formed by two mold halves of a compression mold, under pressure and at elevated temperature to give the sandwich component. At least one mold half is heated to a higher maximum temperature in a first temperature-control zone than in a second temperature-control zone.

Additionally specified is a compression mold having two mold halves which are movable relative to one another and which in the closed state enclose a cavity in the shape of a component to be produced. The compression mold additionally has two temperature-control apparatuses by means of which in at least one mold half a first temperature-control zone and a second temperature-control zone are temperature-controllable independently of one another. Additionally provided is a control device which is in an operative connection with the two temperature-control apparatuses and is set up to heat the first temperature-control zone to a higher temperature than the second temperature-control zone.

A starting point for the invention is the consideration of exerting a targeted influence on the foam particles and their connection to one another and to the bordering materials by subjecting the foam particles to different thermal influencing in different portions of the component. This influencing is achieved through the provision of at least one first and one second temperature-control zone, which are temperature-controllable independently of one another. A temperature-control zone refers to a portion of a mold half which can be heated or cooled to a mandated temperature in a targeted way. The temperature-control zone comprises more particularly a mold wall which bounds the cavity. It is heated to the mandated temperature and transmits the temperature through thermal conduction to the foam particles and shells located in the cavity.

A pressure is built up in the closed mold that causes the foam particles to be pressed closer to one another and deformed, thereby reducing the voids between the foam particles (interstitial compaction). As a result of the simultaneous heating, the foam particles undergo superficial melting and/or an adhesive applied to the foam particles beforehand is activated. The foam particles are bonded to one another and to the shell components. At the same time the foam particles, as a result of the heating, attempt to expand, which is a limited possibility in the closed mold and results in an increased internal pressure. If the internal pressure rises beyond a certain level, impressions are formed in the shells and may be visible on the subsequent component surface. Through the provision of at least two temperature-control zones it is now possible to heat the foam particles to differing extents in different component portions and so to exert a targeted influence on the internal pressure which builds up. Where, for example, the foam particles are heated to or above their melting point, the foam particles collapse under the pressure of the mold, causing the internal pressure in the mold to drop locally. Through controlled deployment of different temperatures in the mold, therefore, it is possible to counteract impressions on the surface. This also makes it possible in particular to produce outer skin components having greatly differing component thicknesses in sandwich construction.

The temperature-control apparatus is set up to control the temperature-control zone in the mold half or halves—more particularly a mold surface bounding the cavity—to a mandated temperature. The temperature-control apparatus is set up more particularly to perform temperature control of the mold half (or halves) during the closing or opening of the compression mold and when the compression mold is closed. The temperature-control apparatus may for this purpose have, for example, a reservoir vessel with a temperature-control medium, a heating-cooling apparatus for heating or cooling the temperature-control medium, and a pump which conveys the temperature-control medium via lines or channels from the reservoir vessel to the mold half and back.

It is possible accordingly for there to be temperature-control channels, through which the temperature-control medium is passed, in or on the mold half or halves. The temperature-control medium controls the temperature of the surrounding mold half, and more particularly the mold surface facing the cavity, by thermal conduction. With temperature control in this way it is easily possible to control the temperature of the component in the cavity even when the mold is closing/opening or is closed. This enables an adaptation of the temperature at each point in time during the method.

The temperature-control medium used is preferably a fluid. Water is an especially suitable temperature-control medium, owing to its high heat capacity and good thermal conductivity.

In order to ensure rapid temperature control of the mold in conjunction with low energy consumption, in one embodiment the temperature-control medium can be kept in reservoir vessels with constant entry temperature. For example, three reservoir vessels may be provided, with the temperature-control medium being kept in one vessel with a first maximum temperature for the first temperature-control zone, in another vessel with a second maximum temperature for the second temperature-control zone, and in the third vessel with a cooling temperature for cooling the heated mold halves.

In certain use scenarios it may be advantageous if both mold halves each have a first and second temperature-control zone, which are temperature-controllable independently of one another by means of the temperature-control apparatuses. In one embodiment this can be utilized to heat both mold halves to a higher maximum temperature in the first temperature-control zone than in the second temperature-control zone during the method. This opens up the possibility of causing the higher temperature to act from both sides on the sandwich component and hence achieving the desired temperature more quickly over the entire component height. For example, the first temperature-control zone in the first mold half and the first temperature-control zone in the second mold half may lie opposite one another and therefore act on the same component portion. With two opposite first temperature-control zones it is possible in particular to carry out full melting of the foam particles in the component portion temperature-controlled by this zone, and to cause them to collapse. In this way it is possible, for example, to realize sandwich components which have flange portions in which the outer shell and the inner shell are brought virtually together. In this case the higher temperature may be selected such that the foam particles melt fully in these flange portions, collapse when the mold is closed, and remain as a thin layer of adhesive between the outer shell and inner shell. This affords the additional advantage of high-strength joining of upper shell and inner shell.

In one embodiment, correspondingly, it is possible for the maximum temperature in the first temperature-control zone to be set in such a way that there is at an least partial collapse of the foam particles in the bordering component portion, and for the maximum temperature in the second temperature-control zone to be set in such a way that the foam particles in the bordering component portion bond to one another and to the outer shell and inner shell without collapsing.

The arranging of the foam particles between the outer shell and the inner shell takes place preferably by the crack-gap process. In that case the method comprises the steps of:
  inserting the outer shell and the inner shell into respective mold halves of the compression mold. This may be done manually or automatically. The shell parts inserted can be fixed in the mold half by reduced pressure, for example.
  partially closing the compression mold, to leave a mandated gap between the outer shell and the inner shell,
  introducing the foam particles into the gap between the outer shell and the inner shell, and
  subsequently fully closing the compression mold.

In this case the foam particles are conveyed into the cavity from a filling vessel by means of a feed apparatus, an injector for example, through feed openings formed in a mold half. At the corresponding feed points, the outer shell or the inner shell is provided with corresponding passages, so that the foam particles can pass between the shells and fill the gap. The foam particles are compressed and compacted by the subsequent closing of the compression mold. In this case the compression mold is configured as a positive mold, thereby ensuring that the foam particles introduced into the gap remain in the cavity. Around the feed openings and in a marginal region of the cavity, the surface of the mold halves that bounds the cavity may additionally be provided with a nonstick coating in order to prevent the foam particles becoming baked on.

With the crack-gap process, the gap filled with foam particles has substantially the same height in each portion of the component. When the mold is closed, the foam particles disposed in regions in which the absolute height of the completed component is lower than in other regions experience a greater percentage compression. Accordingly, in flat regions, where the distance between the outer shell and the inner shell is small or virtually nonexistent, such as in the marginal regions, there is a higher internal pressure and hence a risk of impressions. This can be counteracted by the provision of two temperature-control zones which are temperature-controllable independently of one another.

The arrangement of the foam particles between the outer shell and the inner shell may alternatively take place also in a back-pressure process, or in a combination of crack-gap process and back-pressure process.

In the case of the back-pressure process, the method comprises the steps of:
  inserting the outer shell and the inner shell into respective mold halves of the compression mold. This may be done manually or automatically. The shell parts inserted may be fixed in the mold half by reduced pressure, for example.
  fully closing the compression mold, to leave a residual cavity between outer shell and inner shell, and
  filling the residual cavity with the foam particles, which are introduced into it under pressure.

In this case the foam particles are likewise introduced into the interior of the mold by means of a feed apparatus and via feed openings in a mold half. During the filling procedure, however, the foam particles are compressed by an air pressure. When the residual volume is filled with the desired amount of foam particles, the air pressure is removed and the foam particles expand again and fill the interstices.

It may also be advantageous if the method is operated as a combination of crack-gap process and back-pressure process. In this case the outer shell and the inner shell are each arranged in a mold half and the mold is closed except for a mandated gap. As with the crack-gap process, the foam particles are introduced into the gap, but are additionally already precompacted by air pressure. The compression mold is subsequently closed fully.

With these variant methods as well, it is possible, through a targeted arrangement of two individually temperature-controllable heating zones, which heat the mold to different temperatures, to reduce locally the internal pressure which arises in the mold, and component impressions can be prevented.

In order to avoid impressions on the outer face of the component, the first temperature-control zone is configured advantageously in those regions of the mold half or halves in which the height of the cavity is low. In order to avoid impressions on the outer side of the sandwich component it is particularly advantageous if the first temperature-control zone is configured in a portion, of one mold half or of both mold halves, in which the height of the cavity is lower than 50 percent of the maximum height of the cavity, or lower than 30 percent of the maximum height of the cavity or lower than 20 percent of the maximum height of the cavity. The height of the cavity in this context is considered in the direction of the closing axis of the mold. In other words, the regions of the compression mold that are controlled to a higher temperature are those in which the cavity has a flatter configuration and the component is to have a lower component thickness than in other regions. The higher temperature control in this region favors the collapse of the foam particles under the pressure of the closing or closed compression mold, and so prevents a corresponding local increase in pressure, which could result in impressions on the outer face of the component.

In order to produce flange portions, i.e., component portions in which no foam core is provided, but instead the outer shell and the inner shell lie virtually one atop another and are joined to one another by a thin layer of adhesive, in one embodiment the first temperature-control zone is configured in a portion, of one mold half or of both mold halves, in which the height of the cavity (with the mold closed) corresponds substantially to the sum total of outer shell thickness and inner shell thickness. The term "substantially" in this context should be taken to mean that the height of the cavity is not more than 2 mm, preferably not more than 1 mm, greater than the sum total of outer shell thickness and inner shell thickness at this location in the compression mold. With an embodiment of this kind it is also possible, in particular, to produce a sandwich component having a flange portion which runs all round on the marginal side. As a result of the first temperature-control zone, the foam particles can be melted fully, leaving only a thin layer of plastic as adhesive between the outer shell and inner shell.

The shell components, i.e., outer shell and inner shell, are preferably three-dimensionally shaped shells which substantially already model the surface shape of the completed sandwich component. They are no longer shaped by the method described, but instead are merely given a foam core and joined to one another. The outer shell and inner shell may be configured, for example, as shaped sheet-metal parts or fiber-reinforced plastics components. The fiber-reinforced plastics components may be processed further as components already trimmed in their final contour, or prior to trimming, which in that case may be performed only after full foaming, on the completed sandwich component. The fiber-reinforced plastics components may comprise, for example, fiber reinforcements composed of carbon fibers and/or glass fibers, incorporated in a thermoset or thermoplastic matrix material. The thermoset matrix material may already be fully cured or partially cured, and so the final curing can take place in the compression mold, for example.

The foam particles are thermoplastic foam particles or beads for producing a beaded foam. Foam particles of these kinds may be configured, for example, of expanded polypropylene (EPP) or of polyethylene terephthalate (PET). EPP possesses a high energy absorption capacity. The foam particles may additionally be coated with a thermal activator or adhesive, which permits or promotes the joining of the foam particles to one another through the introduction of heat. Foam particles may be used, in particular, which are also suitable in the context of the Atecarma process.

Features and details that are described in connection with the compression mold are also valid in connection with the method of the invention, and vice versa in each case, and so reference is or can be always made reciprocally in relation to the disclosure regarding the individual aspects of the invention.

Further advantages, features and details of the invention are evident from the description hereinafter, in which exemplary embodiments of the invention are described in detail with reference to the drawings. Here, the features mentioned in the claims and in the description may each be essential to the invention individually on their own or in any desired combination. Where the term "may" is used in this patent application, it relates both to the technical possibility and to the actual technical implementation.

Exemplary embodiments are elucidated below with reference to the appended drawings.

DETAILED DESCRIPTION OF THE DRAWINGS

Figure 3:
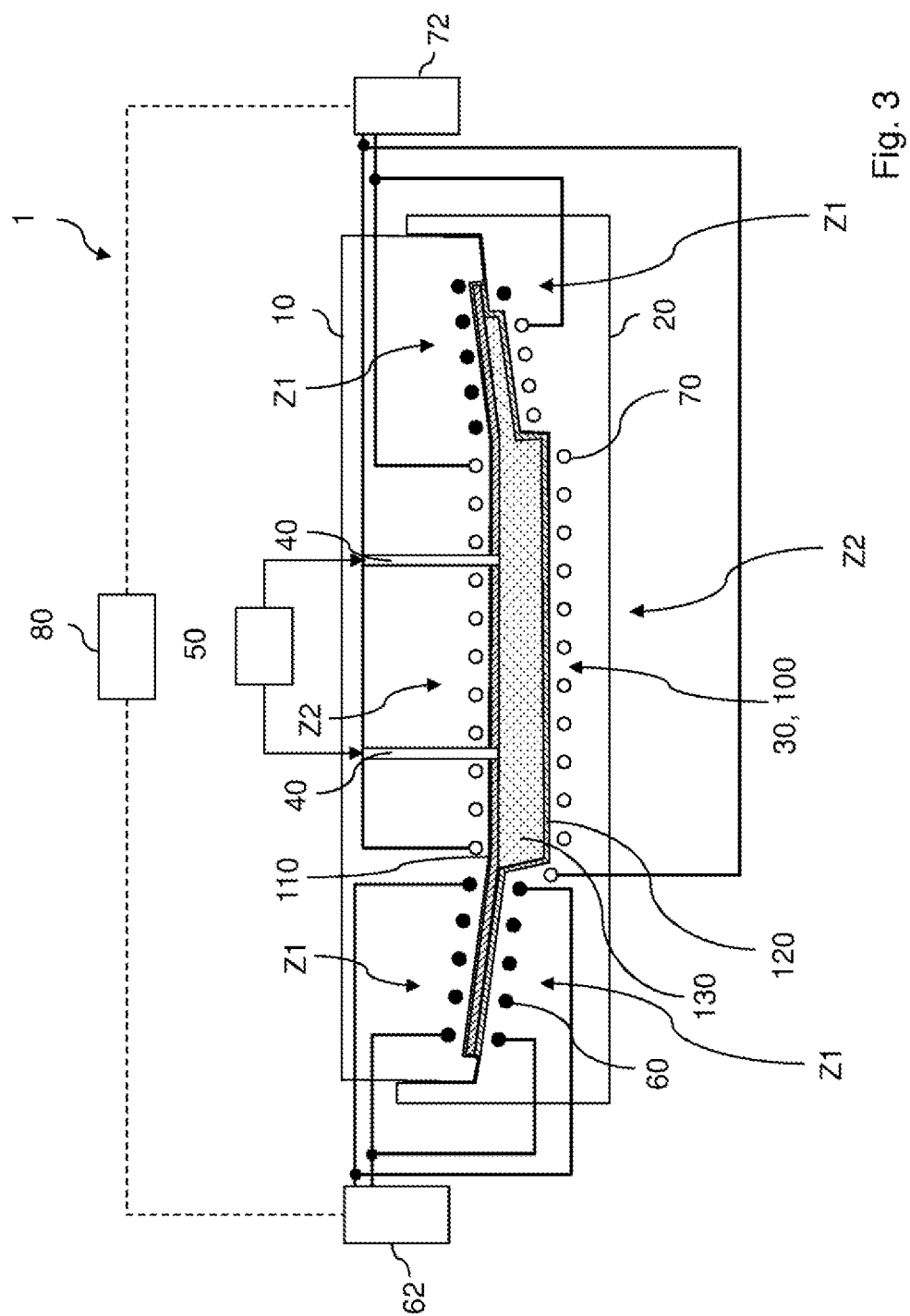
FIG. 3 shows an illustrative compression mold.

In step A of the method, an inner shell 110 and an outer shell 120 are inserted into a compression mold, such as the compression mold 1 shown in FIG. 3, for example. The inner shell 110 is fixed for example on the upper mold half 10, by means of reduced pressure (suction), for example, and the outer shell 120 is inserted into the lower mold half 20. The inner shell 110 and the outer shell 120 may be configured, for example, as fiber-reinforced plastics components or sheet-metal components. The inner shell 110 and the outer shell 120 already have a shape which models the surface profile of the sandwich component 100 to be manufactured. Inner shell 110 and outer shell 120 lie against the corresponding mold half 10, 20. The inner shell 110 and the outer shell 120 are configured, for example, as fiber-reinforced plastics components.

In step B, the foam particles 130 are then introduced into the compression mold 1 and compressed under pressure and at elevated temperature. As elucidated in more detail below with reference to FIG. 2, at least one mold half of the compression mold, however, has two temperature-control zones Z1 and Z2, in which the mold half is heated to differing maximum temperatures. Under the influence of the elevated temperature and pressure, the foam particles 130 are fused to one another to form a beaded foam and joined to the inner shell 110 and the outer shell 120.

There are various possible ways of introducing the foam particles. Where the crack-gap process is used, the compression mold 1 is closed except for a mandated gap, leaving a void between the outer shell 110 and the inner shell 120. The foam particles 130 are introduced into the void through one or more feed openings 40 in a mold half 20, and fill this void. The foam particles may be, for example, EPP foam particles. The compression mold 1 is then moved into the closing position. The pressure generated in this operation causes compaction of the foam particles 130. During this the mold halves 10, 20 are heated.

In the case of the back-pressure process, the compression mold 1 with the inserted inner shell 110 and outer shell 120 is closed fully and the foam particles 130 are introduced under pressure into the residual cavity which remains. The mold halves 10, 20 may be heated during the introduction of the foam particles 130 or only subsequently. Severe heating during the filling of foam particles 130 may contribute to the filling of only narrow "adhesive gaps" between outer shell and inner shell.

Where the crack-gap process and back-pressure process are combined, the compression mold 1 is closed except for a mandated gap and the foam particles 130 are introduced under pressure into this gap and already compacted. The compression mold 1 is subsequently closed fully, producing a further compaction.

When the foam particles 130 are joined to the inner shell 110 and the outer shell 120 to give the sandwich component, the mold halves 10, 20 are subsequently cooled in step C.

In step D, the compression mold 1 is opened and the sandwich component 100 can be withdrawn.

Figure 1:
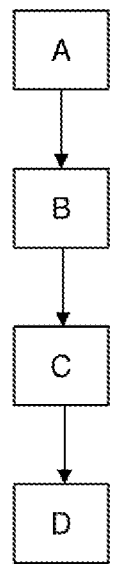
FIG. 1 shows a schematic method procedure.
Figure 2:
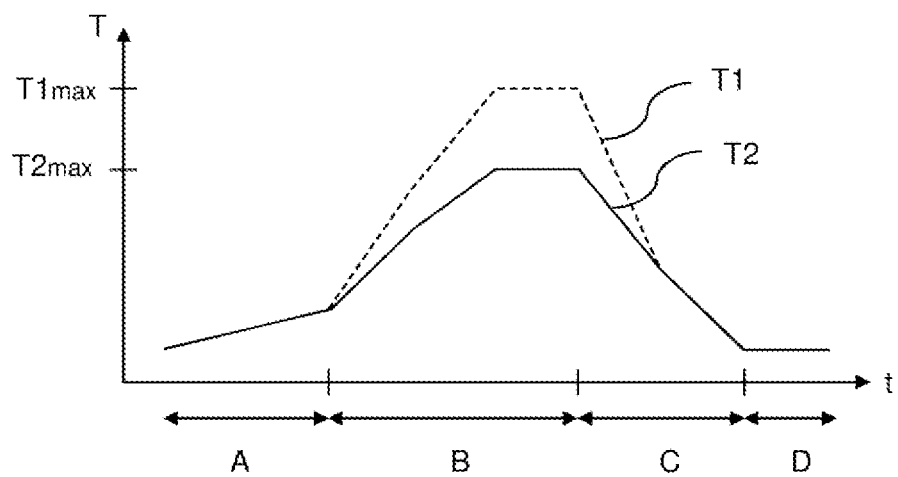
FIG. 2 shows a schematic temperature regime during the method.

FIG. 2 shows an illustrative temperature profile during the method. In this profile, the dashed line T1 shows the temperature profile in a first temperature-control zone in the compression mold 1, and the continuous line T2 shows the temperature profile in a second temperature-control zone in said mold.

During step A, the mold halves 10, 20 are already slightly heated, to a temperature, for example, in the range from 60 to 110 degrees Celsius (° C.). During step B, the temperature is increased to a maximum T1max and T2max. Taking the example of a crack-gap process, for example, during the introduction of the foam particles between the outer shell 110 and the inner shell 120, the temperatures are increased to a greater extent, and at the point in time when the compression mold 1 is moved into its closing position in step C, the temperature profiles each attain their maximum, T1max and T2max, in both temperature-control zones. The first temperature-control zone Z1, however, is heated to a markedly higher temperature than the second temperature-control zone. For example, the maximum temperature T1max in the first temperature-control zone Z1 may be 165° C., and the maximum temperature T2max in the second temperature-control zone Z2 may be 145° C. As a result of the higher temperature in the first temperature-control zone Z1, the foam particles are heated, for example, to an extent such that they undergo at least partial melting and undergo partial or full collapse under the pressure of the compression mold, whereas the foam particles in the second temperature-control zone Z2 merely bond to one another and to the shells. When the compression mold 1 and the inserted materials are fully heated, a cooling takes place in step C, for which the temperature in both temperature-control zones is reduced, to a temperature of 100° C., for example. Subsequently the mold 1 can be opened in step D and the sandwich component 100 withdrawn. The specified temperatures are illustrative temperatures for the use of EPP foam beads and may adopt different values in the case of different materials.

FIG. 3 is a schematic view in section of a compression mold 1 in a closing position. The compression mold 1 is embodied as a positive mold and has a first mold half 10 and a second mold half 20, which in the closed state surround a cavity 30. In a mold half 10 there are feed openings 40 provided, through which foam particles 130 can be introduced into the cavity 30 by means of a feed apparatus 50.

The mold halves 10, 20 are temperature-controllable. Both in the first mold half 10 and in the second mold half 20 there are two temperature-control zones Z1 and Z2 configured that are temperature-controllable independently of one another. Provided in each temperature-control zone are channels in the mold half. For reasons of clarity, the channels 60 in the first temperature-control zone Z1 are each represented as solid circles, the channels 70 in the second temperature-control zone Z2 as open circles.

The channels 60 in the first temperature-control zone Z1—both in the first and in the second mold half 10, 20—are in communication with a first temperature-control apparatus 62, which is able to pass a temperature-control medium, such as water, for example, through the channels 60. The channels 70 of the second temperature-control zone Z2 are in communication with a second temperature-control apparatus 72, which is likewise able to pass a temperature-control medium through the channels 70. Additionally provided is a control device 80, which is in an operative connection with the first and second temperature-control apparatuses 62, 72, controls the temperature-control apparatuses, and is set up, for example, to heat the first temperature-control zone Z1 to a higher temperature than the second temperature-control zone Z2. The control device 80 is set up more particularly to control a temperature profile T1, T2, as is described in FIG. 2.

In the compression mold 10, in accordance with the method described above, a sandwich component 100 has been produced, in which an outer shell 110 and an inner shell 120 are bonded to a beaded foam core 130 lying between them. The sandwich component 100 is a component having different component thicknesses.

The first temperature-control zone Z1, in which a higher maximum temperature is reached, is configured in regions of the mold halves 10, 20 in which the sandwich component has a flat configuration, such as in regions, for example, in which the height of the cavity 30 corresponds substantially to the sum total of outer shell 110 thickness and inner shell 120 thickness, or in regions in which the height of the cavity is lower than 50 percent of the maximum height of the cavity, or lower than 30 percent of the maximum height of the cavity or lower than 20 percent of the maximum height of the cavity.

Figure 4:
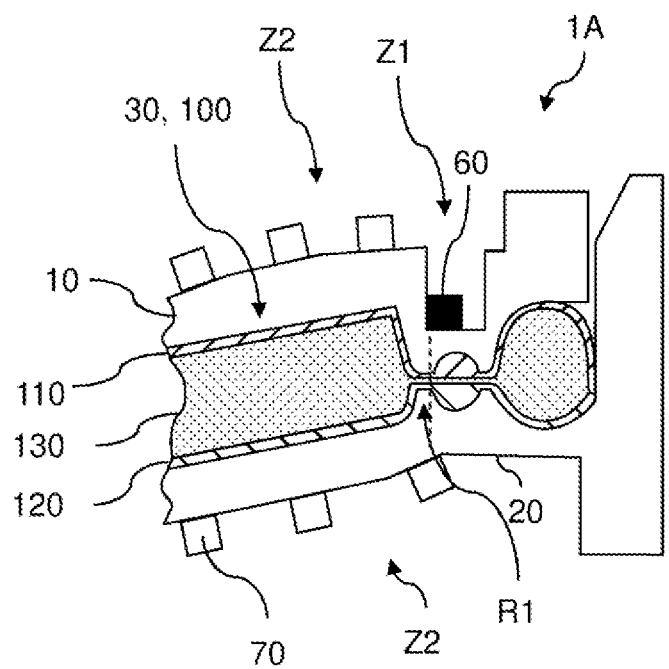
FIGS. 4 and 5 show detailed views of a further illustrative compression mold.
Figure 5:
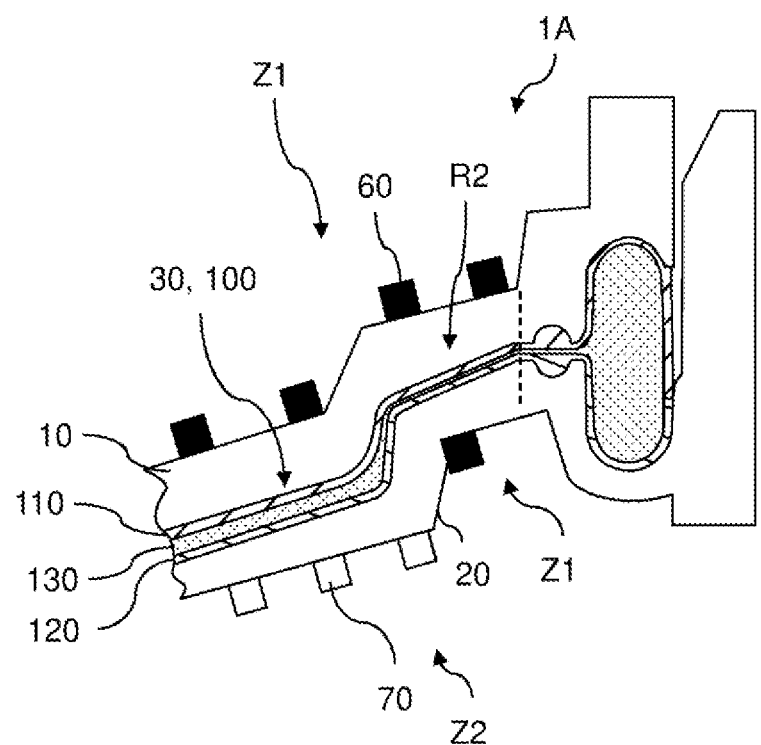

FIG. 4 and FIG. 5 show details of an alternative compression mold 1A in a schematic view. In the compression mold 1A, untrimmed shells are further-processed to give the sandwich component, and are trimmed jointly in a downstream method step, by milling, punching or with water-jet trimming, for example. The cavity 30 is embodied accordingly and on the marginal side, for example, has regions for accommodating projecting dry fiber ply portions. The dashed lines in FIGS. 4 and 5 indicate where the trimming is approximately to take place. It is of course also possible for shells that have already been trimmed to be introduced into a mold 1, 1A of the invention, whose cavity can be adapted accordingly.

The compression mold 1A differs from the compression mold 1 from FIG. 3 in that the channels 60, 70 are arranged not in the mold halves 10, 20, but rather on the mold halves 10, 20. For reasons of illustration, the channels 60 of the first temperature-control zone Z1 are show as solid squares, and the channels 70 of the second temperature-control zone Z2 as open squares.

FIG. 4 shows a portion of the mold 10A in which the cavity 30 and hence the component 100 has a large height and a relatively thick foam core is configured. Only in a narrow marginal region R1 are the outer shell 120 and the inner shell 110 to be brought together again. Configured in this marginal region R1, in the upper mold half 10, is an additional temperature-control zone Z1 having a higher maximum temperature. On the opposite side there is only one temperature-control zone Z2.

FIG. 5 shows a different portion of the same mold 10A. In this portion the cavity 30 and hence the component 100 have a small height, and in a marginal region R2 a wide flange is to be configured, in which the outer shell 120 and the inner shell 110 are brought together again. The additional temperature-control zone Z1, with a higher maximum temperature, is configured here in the upper mold half 10, over the entire flat region and the flange region, and additionally in the lower mold half 20 in the flange region.

In the first or additional temperature-control zone Z1, the compression mold 1, 1A is heated to a greater extent than in the second temperature-control zone; see FIG. 2. As a result, the foam particles 130 can be made to collapse and melt in a targeted manner in relatively flat component portions, thereby preventing unwanted local increase in the internal mold pressure and reducing impressions on the component surface.

Although in the illustrative compression molds 1 and 1A a first and second temperature-control zone is provided in each mold half 10, 20, it may also be the case that only one of the two mold halves 10 or 20, has two temperature-control zones Z1 and Z2 which are temperature-controllable independently of one another.

The invention claimed is:

1. A method for producing a sandwich component, comprising:
    compressing an outer shell and an inner shell together with foam particles lying between them in a cavity, which cavity is formed by two mold halves of a compression mold, under pressure and at elevated temperature to provide the sandwich component, wherein
    at least one mold half is heated to a higher maximum temperature in a first temperature-control zone than in a second temperature-control zone.

2. The method according to claim 1, wherein
    both mold halves have first and second temperature-control zones and are heated to a higher maximum temperature in the first temperature-control zone than in the second temperature-control zone.

3. The method according to claim 2, wherein
    the maximum temperature in the first temperature-control zone is set in such a way that there is an at least partial collapse of the foam particles in a bordering component portion, and
    the maximum temperature in the second temperature-control zone is set in such a way that the foam particles in a bordering component portion bond to one another and to the outer shell and inner shell without collapsing.

4. The method according to claim 1, wherein
    the maximum temperature in the first temperature-control zone is set in such a way that there is an at least partial collapse of the foam particles in a bordering component portion, and
    the maximum temperature in the second temperature-control zone is set in such a way that the foam particles in a bordering component portion bond to one another and to the outer shell and inner shell without collapsing.

5. The method according to claim 1, further comprising:
    inserting the outer shell and the inner shell into respective mold halves of the compression mold;
    partially closing the compression mold, to leave a mandated gap between the outer shell and the inner shell;
    introducing the foam particles into the gap between the outer shell and the inner shell; and
    subsequently fully closing the compression mold.

6. The method according to claim 1, further comprising:
    inserting the outer shell and the inner shell into respective mold halves of the compression mold;
    fully closing the compression mold, to leave a residual cavity between the outer shell and the inner shell; and
    filling the residual cavity with the foam particles, which are introduced into the cavity under pressure.

7. The method according to claim 1, wherein
    the first temperature-control zone is configured in a portion, of one mold half or of both mold halves, in which a height of the cavity corresponds substantially to a sum total of an outer shell thickness and an inner shell thickness.

8. The method according to claim 1, wherein
    the first temperature-control zone is configured in a portion, of one mold half or of both mold halves, in which a height of the cavity is lower than 50 percent of a maximum height of the cavity.

9. The method according to claim 1, wherein
    the outer shell is configured as a shaped sheet-metal part or fiber-reinforced plastics component, and
    the inner shell is configured as a shaped sheet-metal part or fiber-reinforced plastics component.

* * * * *